United States Patent
Mellergård

(10) Patent No.: US 12,365,288 B2
(45) Date of Patent: Jul. 22, 2025

(54) STORAGE ASSEMBLY FOR A VEHICLE, VEHICLE, AND METHOD FOR CLOSING A LID OF A STORAGE ASSEMBLY

(71) Applicant: Volvo Car Corporation, Gothenburg (SE)

(72) Inventor: Edvin Mellergård, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 339 days.

(21) Appl. No.: 18/083,759

(22) Filed: Dec. 19, 2022

(65) Prior Publication Data

US 2023/0192001 A1   Jun. 22, 2023

(30) Foreign Application Priority Data

Dec. 21, 2021   (EP) ..................................... 21216674

(51) Int. Cl.
*B60R 5/02* (2006.01)
*B62D 25/08* (2006.01)
*B62D 25/10* (2006.01)

(52) U.S. Cl.
CPC .............. *B60R 5/02* (2013.01); *B62D 25/087* (2013.01); *B62D 25/105* (2013.01)

(58) Field of Classification Search
CPC ........... B60R 5/02; B60R 5/04; B62D 25/087; B62D 25/10; B62D 25/105; B62D 25/12
USPC .................................................. 296/37.1, 76
See application file for complete search history.

(56) References Cited

U.S. PATENT DOCUMENTS

| | | | |
|---|---|---|---|
| 11,325,656 B2 * | 5/2022 | Glickman | B60R 7/02 |
| 11,400,864 B2 * | 8/2022 | Kim | B60R 5/02 |
| 11,827,180 B2 * | 11/2023 | Weber | B62D 25/087 |
| 12,179,844 B2 * | 12/2024 | Mellergård | B60R 21/38 |
| 2006/0028051 A1 * | 2/2006 | Brei | E05F 15/60 |
| | | | 296/193.11 |
| 2011/0056569 A1 * | 3/2011 | Chambo | F16K 15/147 |
| | | | 137/843 |
| 2020/0262482 A1 * | 8/2020 | Makowski | B62D 25/12 |
| 2023/0051752 A1 * | 2/2023 | Baier | B62D 29/043 |

FOREIGN PATENT DOCUMENTS

| | | |
|---|---|---|
| DE | 102019108937 A1 | 10/2020 |
| DE | 102019125586 A1 | 3/2021 |

OTHER PUBLICATIONS

May 13, 2022 European Search Report issued in corresponding EP Application No. 21216674.

* cited by examiner

*Primary Examiner* — Jason S Daniels

(74) *Attorney, Agent, or Firm* — Clements Bernard Walker; Christopher L. Bernard

(57) ABSTRACT

A storage assembly for a vehicle. The storage assembly includes a storage receptacle, a lid being configured for moving between a closing position in which it closes the storage receptacle and an open position, a sealing arrangement being positioned at the storage receptacle or at the lid such that in the closing position of the lid, the sealing arrangement seals the storage receptacle with respect to the lid, and a closing facilitation mechanism being configured for reducing a force for bringing the lid into the closing position from the open position. Moreover, a vehicle is presented which includes such a storage assembly. Additionally, a method for closing a lid of a storage assembly of a vehicle is presented.

13 Claims, 2 Drawing Sheets

STORAGE ASSEMBLY FOR A VEHICLE, VEHICLE, AND METHOD FOR CLOSING A LID OF A STORAGE ASSEMBLY

CROSS-REFERENCE TO RELATED APPLICATION

The present disclosure claims the benefit of priority of co-pending European Patent Application No. 21 216 674.8, filed on Dec. 21, 2021, and entitled "STORAGE ASSEMBLY FOR A VEHICLE, VEHICLE, AND METHOD FOR CLOSING A LID OF A STORAGE ASSEMBLY," the contents of which are incorporated in full by reference herein.

TECHNICAL FIELD

The present disclosure relates to storage assembly for a vehicle. Moreover, the present disclosure is directed to a vehicle having such a storage assembly. Additionally, the disclosure relates to a method for closing a lid of a storage assembly of a vehicle.

BACKGROUND

The storage assembly may form a front luggage compartment of the vehicle. Such a luggage compartment may be called a frunk. Also, the storage assembly may form a rear luggage compartment of the vehicle. Such a luggage compartment may be called a trunk. Of course, the storage assembly may also form any other type of luggage compartment, e.g. a side luggage compartment of a bus.

Especially if the storage assembly and the luggage compartment formed therewith is accessible from an exterior, care has to be taken that the storage assembly is reliably sealed when closed. In doing so, water, humidity, dirt or other undesired substances are stopped from entering a storage volume of the storage assembly. Of course, the storage assembly shall also be simple and comfortable in use, i.e. the handling and manipulation of the storage assembly shall require comparatively low forces. Consequently, a human user can handle and manipulate the storage assembly with comparatively low effort.

It has been found that a certain conflict of objectives exists between the tight and reliable sealing and the comfortable use of such a storage compartment.

BRIEF SUMMARY

Consequently, the problem to be solved by the present disclosure is to alleviate or solve this conflict of objectives. The problem is at least partially solved or alleviated by the subject matter of the present disclosure.

According to a first aspect, there is provided a storage assembly for a vehicle. The storage assembly includes a storage receptacle. Moreover, the storage assembly includes a lid being configured for moving between a closing position in which it closes the storage receptacle and an open position. Additionally, the storage assembly includes a sealing arrangement being positioned at the storage receptacle or at the lid such that in the closing position of the lid, the sealing arrangement seals the storage receptacle with respect to the lid. Furthermore, the storage assembly includes a closing facilitation mechanism being configured for reducing a force for bringing the lid into the closing position from the open position. In the open position the lid opens the storage receptacle such that a storage volume can be accessed from outside the storage assembly.

In an example, the receptacle may be cup-shaped. A cup-shaped receptacle is to be understood as a receptacle forming a storage volume, wherein the receptacle delimits the storage volume on all but one sides. In other words, the storage volume is accessible or open on one side only. The storage volume being formed by the cup-shaped receptacle and the cup-shaped receptacle itself can have any form. In an example, the storage volume may be generally block-shaped or generally cylinder-shaped or have any other regular or irregular form. An alternative term for cup-shaped is bowl-shaped.

The finding underlying the present disclosure relates to the fact that when closing the lid of such a storage assembly, shortly before reaching the closing position, the lid already needs to contact the sealing arrangement. Otherwise, the sealing arrangement cannot be compressed and provide the desired sealing effect. In this situation, air is trapped inside a storage volume of the storage assembly being delimited by the storage receptacle and the lid. In order to finally reach the closing position, the sealing arrangement and the air being trapped in the storage volume need to be compressed. Both the sealing arrangement and the air form a spring acting against the closing of the lid. In this context, the trapped air leads to an over-pressure inside the storage volume. Thus, a comparatively high force needs to be applied to the lid in order to bring it into the closing position. This force needs to compensate the spring effects of the sealing arrangement and the trapped air cumulatively.

The idea underlying the present disclosure is, thus, to provide a closing facilitation mechanism which is configured for reducing a force for bringing the lid into the closing position. As a consequence thereof, a user of the storage assembly only needs to apply a reduced force for closing the lid. This renders the manipulation comfortable and simple. A further advantage of such a closing facilitation mechanism is that a risk for deforming or damaging the lid is substantially reduced. It is obvious that the force for bringing the lid into the closing position needs to be applied to a certain point, line or area of the lid. The higher the force, the higher is the risk to damage or deform this area. This is especially the case if the lid is formed by a portion of a hood of a vehicle or by a portion of a trunk deck of a vehicle.

The closing facilitation mechanism of the storage assembly of the present disclosure may also be designated a closing assistance mechanism.

In an example, the sealing arrangement may be positioned at a rim of the storage receptacle. Alternatively, the sealing arrangement may be located at an interior of the storage receptacle.

In an example, the storage assembly may form a frunk. In another example, the storage assembly may form a trunk. In a further example, the storage assembly may form a side luggage compartment.

In an example, the lid may be plate-shaped.

In an example, the closing facilitation mechanism may include a deformable element forming a portion of a wall of the storage receptacle or being positioned at an inner surface of the lid, such that the deformable element delimits a storage volume. It is noted that the deformable element delimits the storage volume in both alternatives. Due to its deformability and its position, the deformable element is able to selectively increase the storage volume. Thereby, a force resulting from the compression of the trapped air and acting against the lid being moved towards the closing position can be compensated fully or partially. As has been explained above, the trapped air forms a spring. When bringing the lid into the closing position while the sealing arrangement already contacts the lid, this spring is compressed from one side. In this situation, the deformable element can be deformed such that it increases the storage volume and the spring formed by the trapped air is less compressed or not at all.

In an example, the deformable element is mounted to the storage receptacle or the lid by means of a frame. Consequently, the deformable element is reliably mounted to the storage receptacle or the lid. Additionally, the frame may keep the deformable element in form and/or in a position such that it can deform as desired.

In an example, the frame may be additionally configured for holding the sealing arrangement. This allows for a compact design of the storage assembly.

In an example, the frame includes a plastics material. Such a frame may be mechanically stable and robust while at the same time being light-weight.

In an example, the deformable element may be configured to take a first position, in which the deformable element is either flat or bulges towards the storage volume, and a second position, in which the deformable element bulges away from the storage volume. Consequently, if the deformable element is in the first position, the storage volume is smaller than in a situation in which the deformable element is in the second position. In the context of the present disclosure, the deformable element takes the first position when the lid is in its open position and when the lid is being closed, but does not yet contact the sealing arrangement and/or the storage receptacle. Thus, the deformable element is in the first position if air is able to travel between the storage volume and an exterior of the storage assembly. The deformable element transfers or transitions to the second position if the lid is in a position relative to the sealing arrangement and/or the storage receptacle in which air cannot transfer between the storage volume and the exterior and if the lid is moved towards its closing position. The same applies if the transfer of air between the storage volume and the exterior thereof cannot be performed fast enough.

In an example, the first and second positions of the deformable element are predefined positions. Moreover, the deformable element may be configured such that it can either be in the first position or in the second position. Such a deformable element may be designated a bistable element.

In an example, the deformable element may be dome-shaped in the first position, the dome-shape pointing towards the storage volume. Alternatively or additionally, the deformable element may be dome-shaped in the second position, the dome-shape pointing away from the storage volume. Thus, the deformable element may be generally dome shaped, wherein it is able to invert its shape. Thus, the storage volume can be selectively increased with high reliability. Moreover, the magnitude of the volume increase is well-defined. Consequently, closing of the lid is facilitated in a simple and reliable manner.

In an example, the deformable element is pre-tensioned towards the first position. This has the effect that the deformable element can come back to the first position when being outside the first position, e.g. in the second position. A further condition for coming back to the first position is of course that a force resulting from the compression of trapped air has been reduced to a predefined extent or eliminated. The closing facilitation mechanism is thus reversible.

In an example the pre-tensioning is achieved by pre-forming the deformable element in the first position.

The pre-tensioned deformable element is very useful in situations in which in a closing position of the lid, trapped air is able to slowly leak, i.e. leave the storage volume. Thus, the deformable element can return to the first position while the storage assembly is closed. Subsequently, if the storage assembly is opened and about to be closed again, the closing facilitation mechanism is operational again.

In an example, the deformable element includes at least one of a plastics material, a rubber material and a fabric material. Using such a material the deformable element may be efficiently manufactured. Furthermore, these materials provide the deformation properties in a simple and reliable manner. It is understood that also other materials being able to provide deformation properties can be used. Consequently, the closing of the lid is facilitated in a simple and reliable manner.

In an example, the deformable element is elastically deformable. In such a configuration, the deformation may only require a comparatively low force and therefore compensate to a high extent the force resulting from trapped air in the storage volume. Moreover, such a deformable element is reliably operational during a comparatively long lifetime.

In an example, the deformable element may be plate-shaped. Thus it can be integrated into the storage assembly in a simple manner. Moreover, it only requires a comparatively small space.

It is noted that also deformable elements being dome-shaped may be designated plate-shaped if a height of the dome is small compared to the dimensions of a base surface of the dome.

In an example, the lid is formed by a portion of a hood of a vehicle or a portion of a trunk deck of a vehicle. The lid is, thus, realized in a space-saving manner.

According to a second aspect there is provided a vehicle including a storage assembly according to the present disclosure. The storage assembly may form a front luggage compartment and the lid may be formed by at least a portion of a hood of the vehicle. Alternatively, the storage assembly may form a rear luggage compartment and the lid may be formed by at least a portion of trunk deck of the vehicle. The vehicle is for example a sedan car or a roadster. In such vehicles, a user of the storage assembly only needs to apply a comparatively low force for closing the lid. This renders the manipulation comfortable and simple. Moreover, a risk for deforming or damaging the lid is substantially reduced. Additionally, the storage volume is reliably sealed with respect to its exterior.

According to a third aspect there is provided a method for closing a lid of a storage assembly of a vehicle. The lid is configured for moving between a closing position and an open position. In the closing position, the lid closes a storage receptacle via a sealing arrangement being interposed between the storage receptacle and the lid. The method includes:
compressing the sealing arrangement by moving the lid towards the storage receptacle, thereby reducing a storage volume of the storage assembly, and
compensating the reduction of the storage volume by deforming at least a portion of a wall of the storage receptacle or by deforming at least a portion of an inner surface of the lid.

As has already been explained in connection with the storage assembly according to the disclosure, the compression of the sealing arrangement leads to a compression of air being trapped in the storage volume of the storage assembly. A force acting against the closing of the lid results from these circumstances. By compensating the reduction of the storage volume, the magnitude of this force is reduced, i.e. fully or partially compensated. It is noted that the deformation occurs while the sealing arrangement already provides a sealing effect. Consequently, the storage assembly is reliably sealed. At the same time the closing of the lid is comfortable and simple. Furthermore, a risk for deforming or damaging the lid is substantially reduced.

In an example, the lid is locked once it reaches the closing position.

In an example, compensating the reduction of the storage volume includes switching the portion of the wall of the storage receptacle or the portion of the inner surface of the lid from a predefined first position into a predefined second position. This results in a predefined and reliable compensation of the volume reduction.

In an example, the method may include removing a volume of gas from the storage volume of the storage assembly, and returning the portion of the wall of the storage receptacle or the portion of the inner surface of the lid to the respective original shape. Consequently, the portion is ready for being used for compensating a volume reduction again. It is noted that the removing of a gas volume may happen passively, e.g. in that a volume of gas leaks from the storage volume to the exterior.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
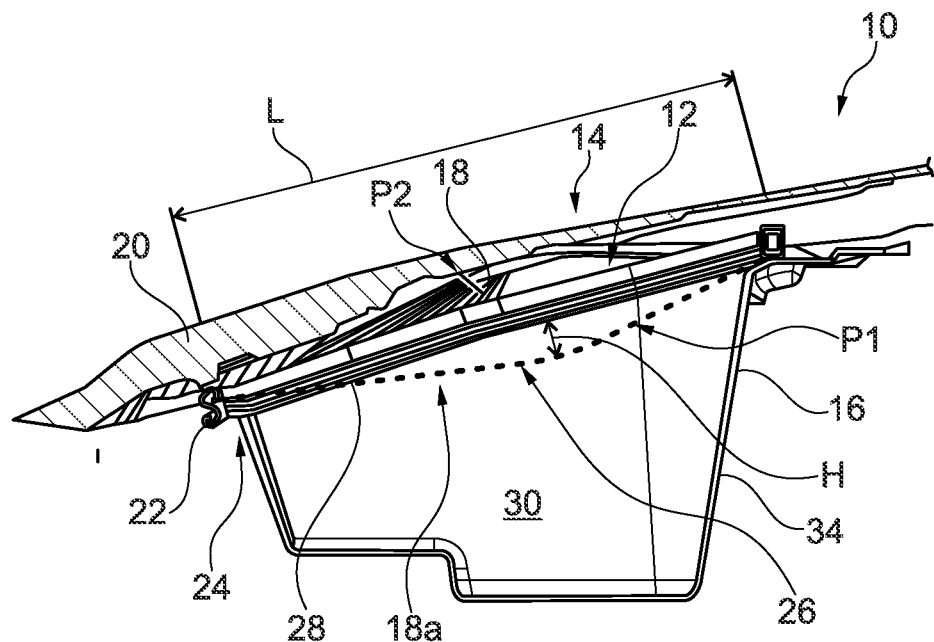
FIG. 1 shows relevant parts of a front portion of a vehicle according to the present disclosure including a storage assembly according to a first example of the present disclosure which can be operated by a method according to the present disclosure.

FIG. 1 shows a front portion of a vehicle 10 including a storage assembly 12.

In the example shown in FIG. 1, the storage assembly 12 forms a front luggage compartment 14 which can also be called a frunk. It is understood that this is just an example. The storage assembly 12 could as well form a rear luggage compartment of the vehicle 10.

The storage assembly 12 includes a storage receptacle 16 and a lid 18 being configured for moving between a closing position in which it closes the storage receptacle 16 and an open position, in which it opens the storage receptacle 16 such that it is accessible for a user.

In the example shown in the Figures, the storage receptacle 16 is cup-shaped.

Since in the present example, the storage assembly 12 forms frunk, the lid 18 is formed by a portion of a hood 20 of the vehicle 10. This means that the lid 18 forms an integral structure with the hood 20. In a case in which the storage assembly 12 forms a rear luggage compartment, the lid 18 may be formed by a portion of trunk deck of the vehicle 10.

The storage assembly is provided with a sealing arrangement 22 which is positioned at a rim 24 of the storage receptacle 16 or at the lid 18.

In any case, the sealing arrangement 22 is arranged such that in the closing position of the lid 18 which is represented in FIG. 1, the sealing arrangement 22 is compressed between the storage receptacle 16 and the lid 18.

The storage assembly 12 also includes a closing facilitation mechanism which is generally designated with reference sign 26. The storage facilitation mechanism is configured for reducing a force for bringing the lid 18 into the closing position.

The closing facilitation mechanism 26 includes a deformable element 28 which is positioned at an inner surface 18a of the lid 18.

In this position, the deformable element 28 together with the remaining portions of the lid and the receptacle 16 delimits a storage volume 30 of the storage assembly 12.

In the present example, the deformable element 28 is made from a rubber material and is elastically deformable.

Moreover, the deformable element 28 is generally dome-shaped when it assumes a first position P1. In this position, the dome-shape points towards the storage volume 30.

It is noted that a height H of the dome-shape is very small when being compared to a length L of a base surface of the deformable element 28.

Thus, the deformable element 28 is also plate-shaped.

The deformable element 28 is also configured for assuming a second position P2 in which it is also dome-shaped. However, in the second position P2, the dome-shape points away from the storage volume 30.

The deformable element 28 is pre-tensioned towards the first position P1. Thus, in the absence of external forces, the dome shape points towards the storage volume 30.

In the present example, the deformable element 28 is mounted to the lid 18 by means of a frame 32. The frame 32 is made from plastics material.

The lid 18 of the storage assembly 12 may be closed using a method for closing a lid of a storage assembly of a vehicle.

Figure 4:
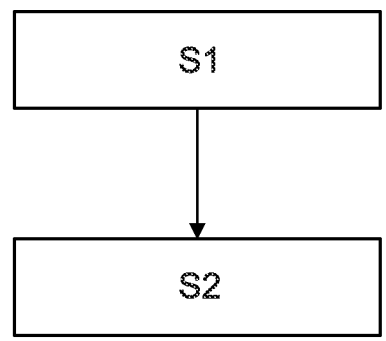
FIG. 4 shows steps of a method for closing a lid of a storage assembly of a vehicle according to the present disclosure.

In a first step S1, the method includes compressing the sealing arrangement 22 by moving the lid 18 towards the rim 24 of the storage receptacle 16 (cf. FIG. 4). This happens if the lid 18 is moved towards its closing position.

In this situation, the lid 18 and the sealing arrangement 22 are in sealing contact such that air being located inside the storage volume 30 is not able to flow into the exterior of the storage assembly 12 and vice versa.

Thus, when further moving the lid 18 towards its closing position, the storage volume 30 of the storage assembly 12 is reduced.

In a second step S2 of the method, this reduction of the storage volume 30 is compensated.

To this end, the deformable element 28 is switched from its first position P1 to its second position P2.

Compensating the reduction of the storage volume 30 leads to a reduction of a force resulting from a compression of the air being trapped in the storage volume 30 when the lid 18 is further moved into its closing position. This force acts against the closing of the lid 18.

Consequently, the lid 18 can be closed using a comparatively low force only. The lid 18, thus, reaches its closing position.

While the lid 18 is in its closing position, a volume of gas may be removed from the storage volume 30 of the storage assembly 12. Due to leakage, this may happen without any action being necessary just by waiting.

Caused by the above-described pre-tensioning of the deformable element 28 into the first position P1, the deformable element 28 may return into its original shape, i.e. the first position P1 if a sufficient volume of gas has been removed. Then the closing facilitation mechanism 26 is ready for use again.

Alternatively, the deformable element 28 may return to its first position if the lid 18 is opened. Also in this situation, the closing facilitation mechanism 26 becomes ready for use again.

Figure 3:
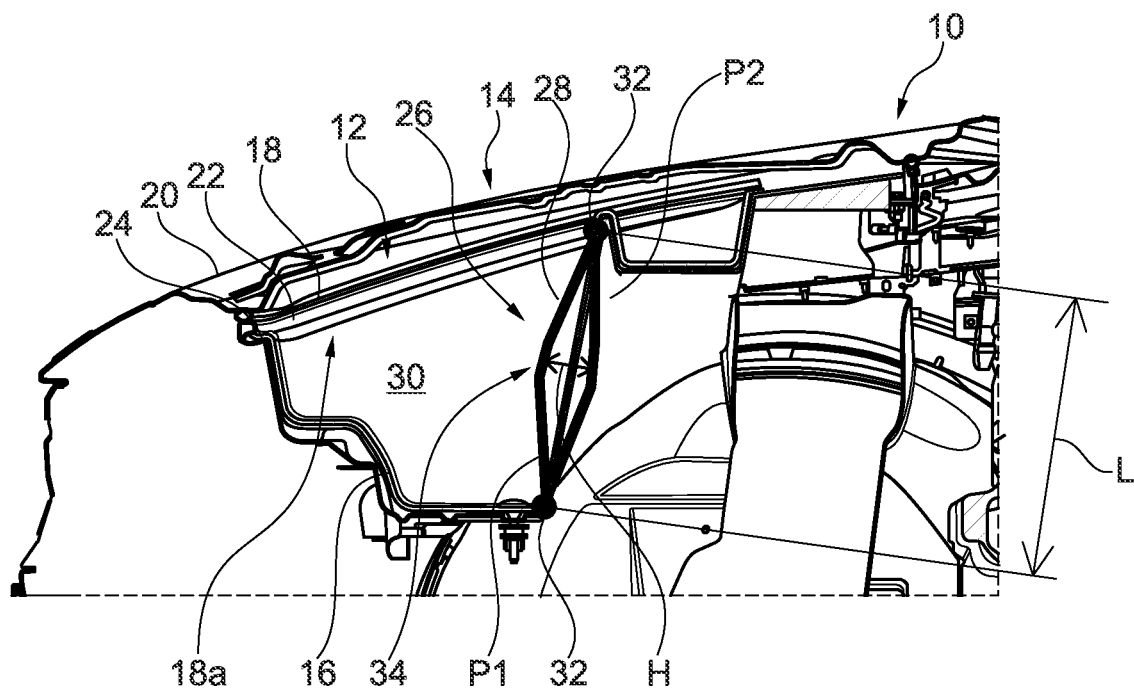
FIG. 3 shows relevant parts of a front portion of a vehicle according to the present disclosure including a storage assembly according to a second example of the present disclosure which can be operated by a method according to the present disclosure.

FIG. 3 shows a front portion of a vehicle 10 including a storage assembly 12 according to a second example.

Figure 2:
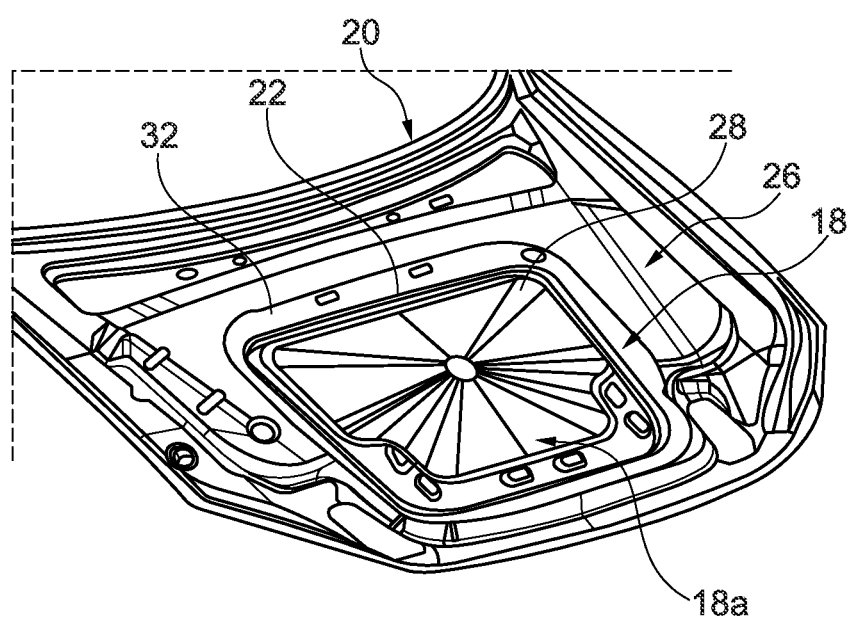
FIG. 2 shows a hood of the vehicle of FIG. 1 including a lid of the storage assembly of FIG. 1.

In the following, only the differences between the second example and the first example shown in FIGS. 1 and 2 will be explained. For the remaining aspects, reference is made to the above explanations.

The second example differs from the first example in that the deformable element 28 forms a portion of a wall 34 of the storage receptacle 16.

Also in this example, the deformable element 28 is mounted to the storage receptacle 16 by means of a frame 32. It is noted that this is just an example. Of course, the deformable element 28 can also be a part of the wall 34 itself or a part of a base of the storage receptacle 16.

The deformable element 28 is shaped as the deformable element 28 of the first example. It is also configured for switching between a first position P1 and a second position P2.

Thus, also the method for closing a lid 18 of a storage assembly 12 of a vehicle 10 as explained above can be applied in connection with the second example (cf. FIG. 4).

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A storage assembly for a vehicle, comprising:
   a storage receptacle,
   a lid being configured for moving between a closing position in which it closes the storage receptacle and an open position,
   a sealing arrangement being positioned at the storage receptacle or at the lid such that in the closing position of the lid, the sealing arrangement seals the storage receptacle with respect to the lid, and
   a closing facilitation mechanism being configured for reducing a force for bringing the lid into the closing position from the open position,
   wherein the closing facilitation mechanism comprises a deformable element forming a portion of a wall of the storage receptacle or being positioned at an inner surface of the lid, such that the deformable element delimits a storage volume, and
   wherein the deformable element is configured to take a first position (P1), in which the deformable element is either flat or bulges towards the storage volume, and a second position (P2), in which the deformable element bulges away from the storage volume.

2. The storage assembly according to claim 1, wherein the deformable element is mounted to the storage receptacle or the lid by means of a frame.

3. The storage assembly according to claim 2, wherein the frame comprises a plastics material.

4. The storage assembly according to claim 1, wherein the deformable element is dome-shaped in the first position (P1), the dome-shape pointing towards the storage volume, and/or wherein the deformable element is dome-shaped in the second position (P2), the dome-shape pointing away from the storage volume.

5. The storage element according to claim 1, wherein the deformable element is pre-tensioned towards the first position (P1).

6. The storage element according to claim 1, wherein the deformable element comprises at least one of a plastics material, a rubber material and a fabric material.

7. The storage assembly according to claim 1, wherein the deformable element is elastically deformable.

8. The storage assembly according to claim 1, wherein the deformable element is plate-shaped.

9. The storage assembly according to claim 1, wherein the lid is formed by a portion of a hood of a vehicle or a portion of a trunk deck of the vehicle.

10. A vehicle comprising the storage assembly according to claim 1, wherein the storage assembly forms a front luggage compartment and the lid is formed by at least a portion of a hood of the vehicle or wherein the storage assembly forms a rear luggage compartment and the lid is formed by at least a portion of a trunk deck of the vehicle.

11. A method for closing a lid of a storage assembly of a vehicle, the lid being configured for moving between a closing position and an open position, wherein in the closing position the lid closes a storage receptacle via a sealing arrangement being interposed between the storage receptacle and the lid, comprising:
   compressing the sealing arrangement by moving the lid towards the storage receptacle, thereby reducing a storage volume of the storage assembly, and
   compensating the reduction of the storage volume by deforming at least a portion of a wall of the storage receptacle or by deforming at least a portion of an inner surface of the lid.

12. The method according to claim 11, wherein compensating the reduction of the storage volume comprises switching the portion of the wall of the storage receptacle or the portion of the inner surface of the lid from a predefined first position (P1) into a predefined second position (P2).

13. The method according to claim 11, comprising:
   removing a volume of gas from the storage volume of the storage assembly, and returning the portion of the wall of the storage receptacle or the portion of the inner surface of the lid to the respective original shape.

* * * * *